United States Patent [19]

Corner et al.

[11] 4,105,254

[45] Aug. 8, 1978

[54] WHEEL WITH RIM EMBRACED BY TIRE

[75] Inventors: Michael Raymond Corner, Coventry; William Lewis Jackson, Sutton Coldfield, both of England

[73] Assignee: Dunlop Limited, London, England

[21] Appl. No.: 710,311

[22] Filed: Jul. 30, 1976

[30] Foreign Application Priority Data

Aug. 8, 1975 [GB] United Kingdom ............... 33137/75

[51] Int. Cl.² .............................................. B60B 3/08
[52] U.S. Cl. ................ 301/63 DS; 152/380; 152/400
[58] Field of Search ............ 152/396, 399, 400, 401, 152/402, 403, 405, 411, 380; 301/63 DS, 63 D

[56] References Cited

U.S. PATENT DOCUMENTS

| 1,645,396 | 10/1927 | Nichols | 301/63 DS |
| 1,836,676 | 12/1931 | Main | 152/405 |
| 2,802,507 | 8/1957 | Clark | 152/401 |

FOREIGN PATENT DOCUMENTS 3,940 of 1913 United Kingdom ............... 301/63 DS

Primary Examiner—Robert B. Reeves
Assistant Examiner—Francis J. Bartuska
Attorney, Agent, or Firm—Stevens, Davis, Miller & Mosher

[57] ABSTRACT

A wheel for use with a tire whose sidewalls are to be maintained in a mechanically compressed condition when it is mounted on the wheel comprises a central disc for attachment to a vehicle, a pair of circumferentially extending radially outwardly facing seating surfaces for each of the radially inward ends of the sidewalls of a tire and a pair of radially outwardly projecting flanges axially inboard of the seating surfaces. Means is provided to force the flanges away from each other after a tire has been mounted on the wheel with its radially inward sidewall ends on the seating surfaces, thereby to force the ends of the sidewalls axially apart while they remain on the seating surfaces.

7 Claims, 6 Drawing Figures

WHEEL WITH RIM EMBRACED BY TIRE

This invention relates to a wheel, and in particular to a wheel suitable for use with a tire whose sidewalls are to be maintained in a mechanically compressed condition when it is mounted on the wheel, such as the tire described in U.S. Patent Application No. 603,808 filed Aug. 12, 1975.

According to the present invention a wheel comprises a central disc portion adapted for attachment to a vehicle, a pair of circumferentially extending substantially radially outwardly facing seating surfaces one for each of the radially inward ends of the sidewalls of a tire, a pair of radially outwardly projecting flanges axially inboard of said seating surfaces and means to force at least said flanges away from each other after a tire has been mounted with its radially inward sidewall ends on said seating surfaces, to permit the ends of said sidewalls to be forced axially apart while they remain on said seating surfaces.

The portion of the wheel bearing the pair of substantially radially outwardly facing surfaces may be integral with the radially outwardly projecting flanges. In one arrangement for example, the flanges and seating surfaces may be at the periphery of a pair of annular plates which may be clamped together at a predetermined spacing but which may be moved closer together than this spacing when being inserted into a tire. Once the plates are in the tire the ends of the tire sidewalls can be placed in position and then the plates moved apart e.g. by jacking screws. Spacers may then be inserted from the center of the wheel and the plates clamped to them. Finally a wheel center may be assembled with the plates if desired.

Alternatively the flanges and seating surfaces may be mounted on a pair of facing dished plates, the edge portions of which are castellated. The plates are arranged so that the castellations extend through the spaces in the opposite plate the flanges and seating surfaces being attached to the castellations. In this case the flanges and seating surfaces are moved apart by moving the plates towards each other.

The wheel of this invention will now be described in more detail by way of example only with reference to the accompanying drawings in which.

Figure 1:
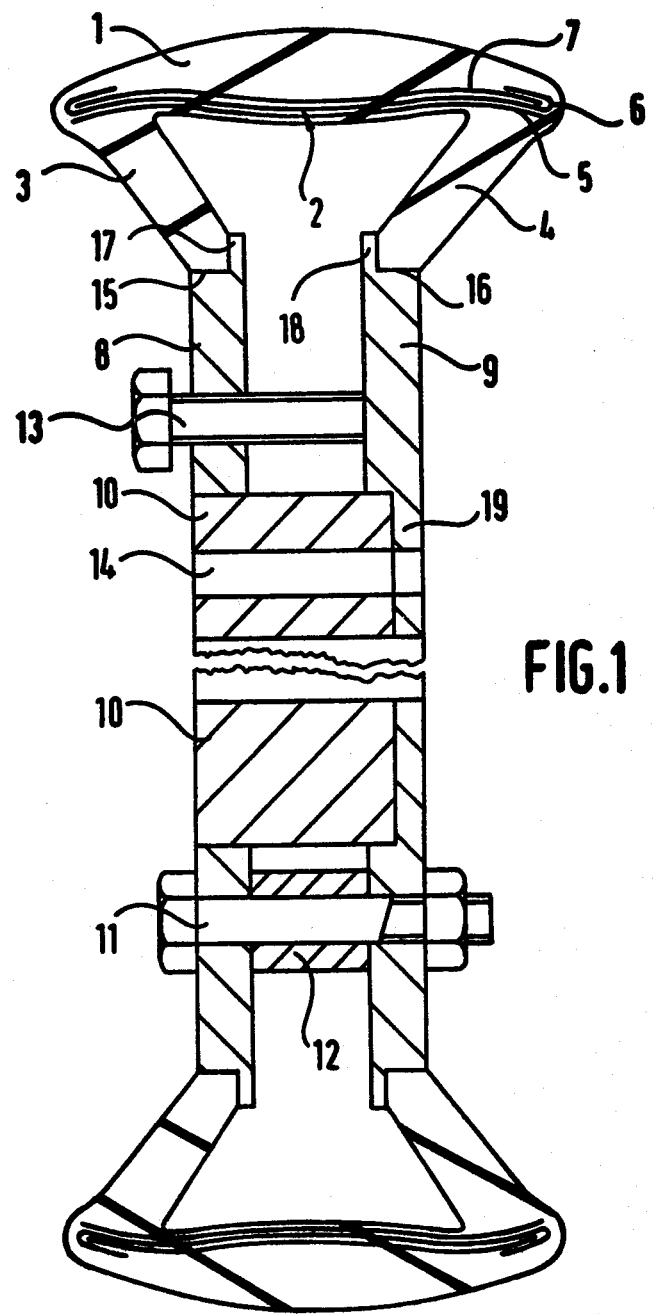
FIG. 1 illustrates a tire and wheel assembly having a tire with pre-compressed sidewalls in position on the wheel.

As shown in FIG. 1 the wheel consists of a pair of annular plates 8 and 9 and a center 10. Each of the annular plates has at its periphery a radially outwardly projecting flange 17, 18.

Figure 2:
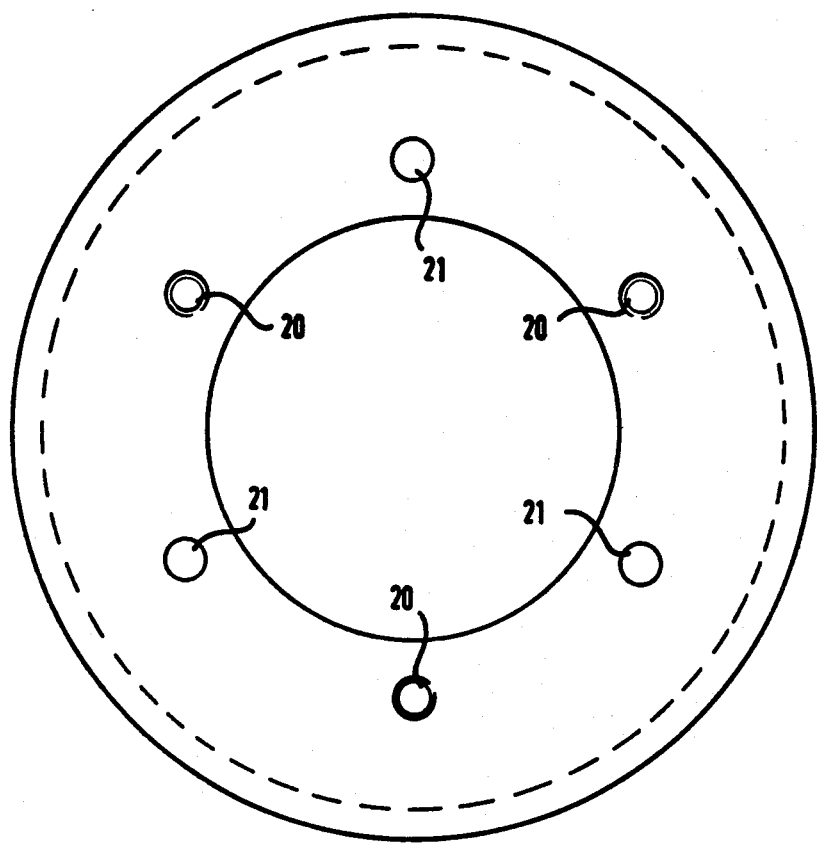
FIG. 2 is an elevational view of one annular plate portion of the wheel.
Figure 3:
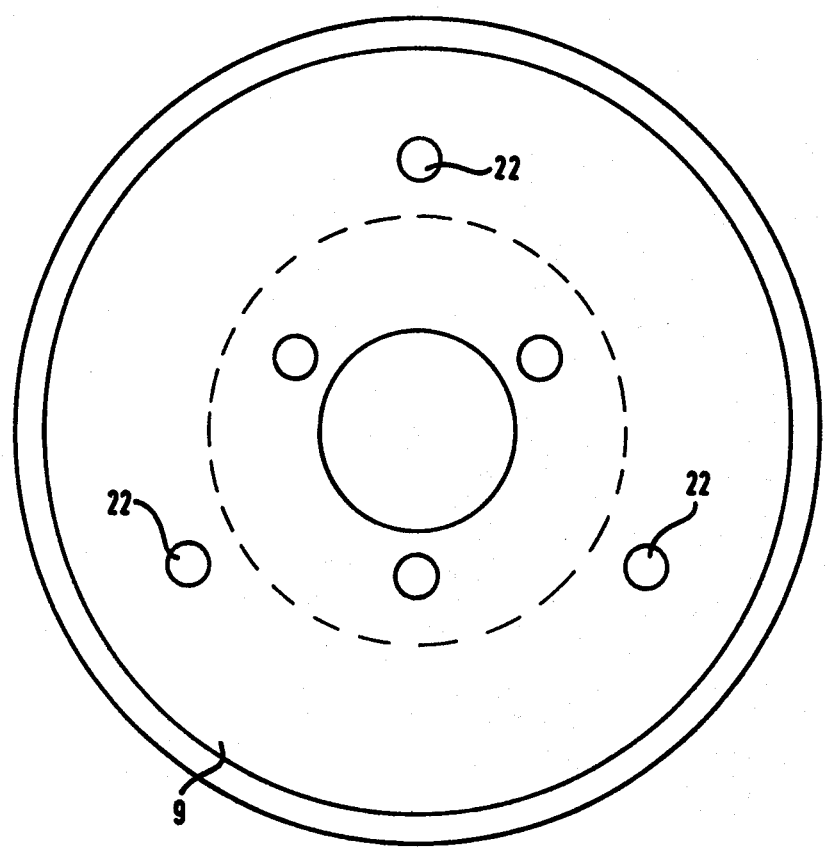
FIG. 3 is an elevational view of the other annular plate portion of the wheel.

As illustrated in FIGS. 2 and 3 the plate 8 has a larger central opening than the plate 9, and the plate 9 has a recessed portion 19 of diameter equal to the diameter of the opening in the plate 8. The plate 8 (FIG. 2) has six equally spaced holes, three holes 20 being screw-threaded and three holes 21 plain, the threaded and non-threaded holes being arranged alternately around the plate. The plate 9 has three plain holes 22 equally spaced around the plate at the same distance from the wheel axis as the holes in the plate 8, and three plain holes equally spaced around its recessed portion 19. The wheel center 10 contains three plain holes 14 at the same spacing as the holes in the recessed portion 19 of plate 9.

The plates 8 and 9 are clamped together by means of three nuts and bolts 11 (FIG. 1) passing through the plain holes 21 and 22 in the plates, spacers 12 being located on the bolts between the plates to hold the plates at a predetermined spacing. The threaded holes 20 in plate 8 contain jacking screws 13 which can be used to force the plates apart.

The tire shown in FIG. 1 consists of a tread portion 1, reinforced by an annular belt assembly 2, and a pair of sidewalls 3 and 4.

The belt assembly consists of three plies 5, 6 and 7, plies 5 and 6 having equal and opposite bias angles in the range 15° to 30°, and ply 7 having a bias angle of 90° with respect to the tire mid-circumferential plane. The cords of the plies 5, 6 and 7 are steel cords, although they may be of other high modulus material such as the recently available aromatic polyamide cord.

The sidewalls 3 and 4 are straight, consist wholly of elastomer and have a ratio of thickness to length which is 3.33 to 1 at their radially innermost ends and 3.1 to 1 at their radially outermost ends, the sidewalls being slightly tapered in cross-section.

To mount the tire on the rim firstly the two plates 8 and 9 are inserted into the tire with the bolts 11 loosely in position to align the holes 21 and 22 in the plates. The end of the tire sidewalls are located on the surfaces and the plates 15, 16 against the flanges 17, 18 are forced apart, to compress the tire sidewalls, by means of the jacking screws 13. The bolts 11 may then be removed, spacers 12 inserted through the wheel center, the bolts 11 replaced, the jacking screws removed and the nuts and bolts 11 used to clamp the plate members firmly together on the spacers. The wheel center 10 is inserted when it is desired to clamp the wheel to a vehicle, stud holes 14 being provided for this purpose.

Figures 4, 5:
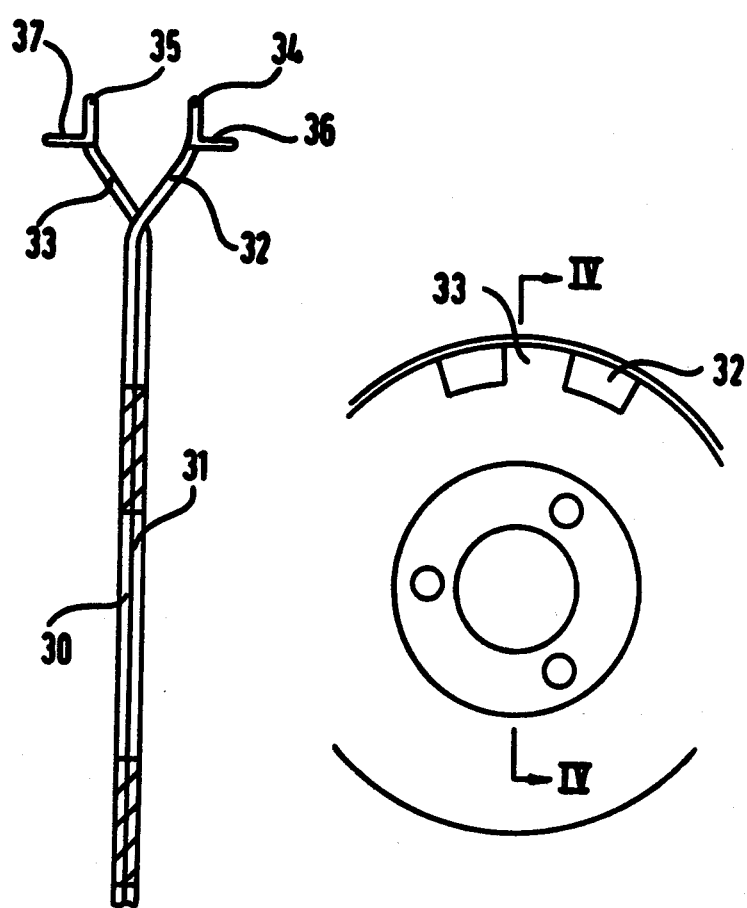
FIG. 4 is a sectional view of a second wheel construction; on line IV—IV of FIG. 5.
FIG. 5 is a partial elevational view of the wheel of FIG. 4.

The wheel shown in FIG. 4 consists of a pair of dished plates 30 and 31 having castellated edges (see FIG. 5). The plates are arranged face to face so that the castellations 32, of the plate 30 extend through the gaps in the edge of the plate 31 and the castellations 33 of the plate 31 extend through the gaps in the edge of plate 30. A ring is attached to the castellations of each of the two plates, each ring forming a radially outwardly directed flange 34, 35 and a radially outwardly facing seating surface 36, 37.

The two plates 30 and 31 have corresponding holes the two flanges 34 and 35 being able to be moved apart by moving the two plates 30 and 31 towards each other and clamping them.

Figure 6:
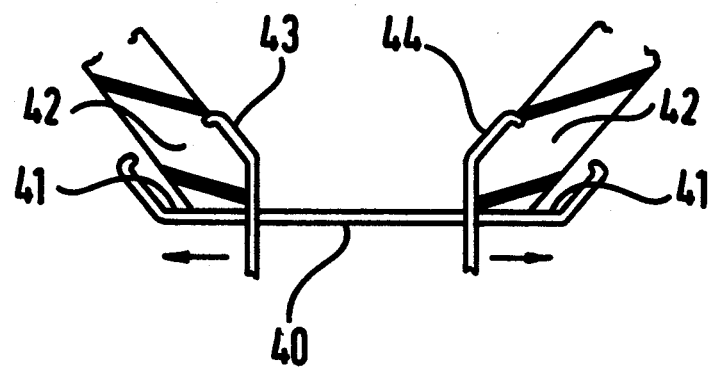
FIG. 6 is a part of a tire and wheel assembly showing a third wheel construction.

The wheel construction shown in FIG. 6 has a wheel rim 40 with bead seats 41 for receiving the beads 42 of a tire. A pair of annular plates formed with radially outwardly projecting flanges 43, 44 at their peripheries are located on the wheel rim 40. A system of jacking screws similar to those described in connection with the wheel illustrated in FIGS. 1 to 3 are used to force the annular plates, and hence the flanges 43, 44, apart so that the beads 42 of the tire are urged axially outwardly into their respective bead seats 41 to precompress the sidewalls of the tire. It should be understood that the movable plates are supported by castellations at the edge of the disc projecting through matching holes in the rim.

The invention is not restricted to the details of the foregoing examples. For instance, it will be appreciated that a relatively small degree of precompression in the tire sidewalls can be obtained by designing the wheel rim so that in mounting the tire on the rim the inner ends of the sidewalls are forced apart to mechanically precompress the sidewalls. This precompression can be increased by subsequently moving the radially outwardly projecting flanges away from each other. Initial relatively small precompression can be obtained in the sidewalls by designing the wheel rim so that the diameter of the radially outwardly facing seating surfaces is greater than the bead diameter of the tire to be mounted on the wheel rim. Thus, when the tire is mounted on the wheel rim its sidewalls will be placed in a state of precompression which can be increased by moving the flanges away from each other.

Having now described our invention, what we claim is:

1. A wheel comprising a central disc portion adapted for attachment to a vehicle, a pair of substantially continuous circumferentially and substantially axially extending tire bead seating surfaces which face radially outwardly, one for each of a pair of continuous beads of the two sidewalls of a tire, a pair of radially outwardly projecting bead locating flanges axially inboard of said seating surfaces, with each flange being adjacent to the inboard edge of a continuous bead of a tire when mounted on the wheel, said seating surfaces and said flanges being the only means retaining the tire bead to the wheel and means to force at least said flanges away from each other after a tire has been mounted with its beads on said seating surfaces, to permit the beads to be forced axially apart while they remain on said seating surfaces.

2. A wheel according to claim 1 wherein the seating surfaces are integral with their respective flanges.

3. A wheel according to claim 2 wherein the disc portion is formed of a pair of annular plates each having formed in the outer curved edge said seating surface and said flange and are clamped together at a given mutual spacing and means are provided for moving the plates further apart when a tire is fitted to the wheel so that the tire beads are moved apart.

4. A wheel according to claim 3 wherein spacers are provided adapted to fit between the plates to maintain the final spacing.

5. A wheel according to claim 4 wherein a wheel center for ready attachment to a vehicle is attached to the pair of clamped plates.

6. A wheel according to claim 1 wherein the seating surfaces and flanges are formed on the projections of a pair of rigid circular plates, the edge of each plate being castellated and the plates being arranged together such that the projecting castellations of one plate extend through the spaces in the other plate such, that when the plates are moved together, the seating surfaces and flanges formed in the castellations are moved apart.

7. A wheel comprising a central disc portion adapted for attachment to a vehicle, a pair of circumferentially extending radially outwardly facing seating surfaces, one for each of the radially inward ends of the two sidewalls of a tire, a pair of radially outwardly projecting flanges axially inboard of said seating surfaces; the seating surfaces and flanges being formed in the projections of a pair of rigid circular plates, the edge of each plate being castellated and the plates being arranged together such that the projecting castellations of one plate extend through the spaces in the other plate such, that when the plates are moved together, the seating surfaces and flanges formed in the castellations are moved apart to permit the ends of said sidewalls to be forced axially apart while they remain on said seating surfaces.

* * * * *